(12) United States Patent
Jessup et al.

(10) Patent No.: US 7,810,779 B2
(45) Date of Patent: Oct. 12, 2010

(54) APPARATUS FOR PREVENTING ACTUATION OF A VEHICLE SEAT POSITION ADJUSTMENT DEVICE

(75) Inventors: Chris P. Jessup, Sheridan, IN (US); Douglas Wayne Bittner, Indianapolis, IN (US)

(73) Assignee: Indiana Mills & Manufacturing Inc., Westfield, IN (US)

( * ) Notice: Subject to any disclaimer, the term of this patent is extended or adjusted under 35 U.S.C. 154(b) by 456 days.

(21) Appl. No.: 11/836,924

(22) Filed: Aug. 10, 2007

(65) Prior Publication Data

US 2008/0054699 A1  Mar. 6, 2008

Related U.S. Application Data

(60) Provisional application No. 60/821,973, filed on Aug. 10, 2006.

(51) Int. Cl.
*F16M 13/00* (2006.01)

(52) U.S. Cl. .................... 248/429; 248/424; 296/65.03; 297/341

(58) Field of Classification Search ................ 248/429, 248/424; 296/65.03; 297/341, 340, 346
See application file for complete search history.

(56) References Cited

U.S. PATENT DOCUMENTS

| | | | | |
|---|---|---|---|---|
| 4,781,354 | A  * | 11/1988 | Nihei et al. | 248/429 |
| 6,616,233 | B1 * | 9/2003 | Debus et al. | 297/341 |
| 6,935,693 | B2 * | 8/2005 | Janscha et al. | 297/344.15 |
| 7,090,188 | B2 * | 8/2006 | Severini et al. | 248/424 |
| 7,506,856 | B2 * | 3/2009 | Ikegaya et al. | 248/430 |

\* cited by examiner

*Primary Examiner*—Anita M King
(74) *Attorney, Agent, or Firm*—Barnes & Thornburg LLP

(57) ABSTRACT

An apparatus is provided for preventing actuation of a seat position adjustment device coupled to a vehicle seat that is adjustably mounted to a vehicle seat frame. The apparatus may comprise a stop member mounted to the seat position adjustment device, and at least one biasing member configured to normally bias the stop member into engagement with the vehicle seat to prevent actuation of the seat position adjustment device.

11 Claims, 9 Drawing Sheets

APPARATUS FOR PREVENTING ACTUATION OF A VEHICLE SEAT POSITION ADJUSTMENT DEVICE

CROSS-REFERENCE TO RELATED APPLICATION

This patent application claims the benefit of, and priority to, U.S. Patent Application Ser. No. 60/821,973, the disclosure of which is incorporated herein by reference.

FIELD OF THE INVENTION

The present invention relates generally to adjustment mechanisms for adjusting a position of a vehicle seat relative to a vehicle seat frame to which the vehicle seat is mounted, and more specifically to mechanisms for preventing actuation of such vehicle seat position adjustment mechanisms.

BACKGROUND

Mechanisms for adjusting the position of a vehicle seat relative to a vehicle seat frame to which the vehicle seat is mounted are known. However, it is desirable to provide an apparatus that normally prevents actuation of such a vehicle seat position adjustment mechanism and that may be manipulated to selectively allow for activation of the vehicle position adjustment mechanism.

SUMMARY

The present invention may comprise one or more of the features recited in the attached claims, and/or one or more of the following features and combinations thereof. An apparatus for preventing actuation of a seat position adjustment device coupled to a vehicle seat that is adjustably mounted to a vehicle seat frame may comprise a stop member mounted to the seat position adjustment device, and at least one biasing member configured to normally bias the stop member into engagement with the vehicle seat to prevent actuation of the seat position adjustment device.

The apparatus may further comprise a handle having the stop member mounted thereto. The handle may be configured to be responsive to force applied thereto that is greater than a biasing force applied to the stop member by the at least one biasing member to draw the stop member away from the vehicle seat to allow actuation of the seat position adjustment device. The apparatus may further comprise a bracket configured to be affixed to the seat position adjustment device. The at least one biasing member may comprise a spring extending between the bracket and the handle. The handle may comprise a lever having a free end and an opposite end, and an elongated bracket member having a free end and an opposite end. The free end of the elongated bracket member may have the stop member mounted thereto, and the opposite ends of the lever and the elongated bracket member may together form a handle mounting portion. The apparatus may further comprise a fixation member configured to extend through the bracket, through the handle mounting portion of the handle and through the spring to movably mount the handle and spring to the bracket and to rigidly secure the bracket to the seat position adjustment device. The seat position adjustment device may comprise at least a first tube and a second tube defining a non-zero angle therebetween. The bracket may comprise a first bracket member configured to engage the first and second tubes along one surface thereof, and a second bracket member configured to engage the first and second tubes along an opposite surface thereof. The fixation member may be configured to mount the apparatus to the seat position adjustment device by extending, in order, through the first bracket member, the handle mounting portion of the handle, the spring and the second bracket member. The first and second bracket members may be secured to the first and second tubes when the fixation member affixes together the first and second brackets with the handle mounting portion of the handle and the spring positioned therebetween. The vehicle seat may comprise a frame member. The handle may be configured such that the force applied to the handle that is greater than the biasing force applied to the stop member by the at least one biasing member is applied to the lever to draw the stop member away from the frame member to allow actuation of the seat position adjustment device.

In an alternative embodiment, the apparatus may further comprise a housing movably mounted to the seat position adjustment device with the at least one biasing member positioned between the housing and the seat position adjustment device. The housing may have the stop member mounted thereto. The vehicle seat may comprise a frame member. The housing may be configured to be responsive to a force applied thereto that is greater than the biasing force of the at least one biasing member to draw the stop member away from the frame member to allow actuation of the seat position adjustment device. The at least one biasing member may comprise two biasing members. The two biasing members may each comprise coil springs. The housing may be configured to extend at least partially about the seat position adjustment device. The housing may comprise a first housing portion and a second housing portion that are attachable to each other. The first and second housing portions may each be configured to extend partially about the seat position adjustment device and to then attach to each other to trap at least a portion of the seat position adjustment device therebetween. The stop member and the housing may be of unitary construction. Alternatively, the stop member may be separate from and secured to the housing.

An apparatus for preventing actuation of a seat position adjustment device coupled to a vehicle seat that is adjustably mounted to a vehicle seat frame may comprise a handle movably mounted to the seat position adjustment device, and at least one biasing member positioned between the handle and the seat position adjustment device and configured to normally bias at least a portion of the handle into engagement with the vehicle seat to prevent actuation of the seat position adjustment device. The apparatus may further comprise a stop member mounted to or integral with the handle. The at least one biasing member may be configured to normally bias the handle toward the vehicle seat such that the stop member engages the vehicle seat and prevents actuation of the seat position adjustment device. The handle may be configured to be responsive to force applied thereto that is greater than a biasing force applied to the stop member by the at least one biasing member to draw the stop member away from the vehicle seat to allow actuation of the seat position adjustment device. The vehicle seat may comprise a frame member. The at least one biasing member may be configured to normally bias the handle toward the frame member of the vehicle seat such that the stop member engages the frame member. The handle may be configured to be responsive to the force applied thereto to draw the stop member away from the frame member to allow actuation of the seat position adjustment device. The apparatus may further comprise a bracket configured to be affixed to the seat position adjustment device. The at least one biasing member may comprise a spring extending between the bracket and the handle. Alternatively, the handle may comprise a housing that extends at least partially about the seat position adjustment device. The at least one biasing member may comprise at least one spring that extends between the housing and the seat position adjustment device.

A method of preventing actuation of a seat position adjustment device coupled to a vehicle seat that is adjustably mounted to a vehicle seat frame may comprise normally engaging a stop member between the seat position adjustment device and the vehicle seat to prevent actuation of the seat position adjustment device, and disengaging the stop member from one of the seat position adjustment device and the vehicle seat to allow actuation of the seat position adjustment device.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
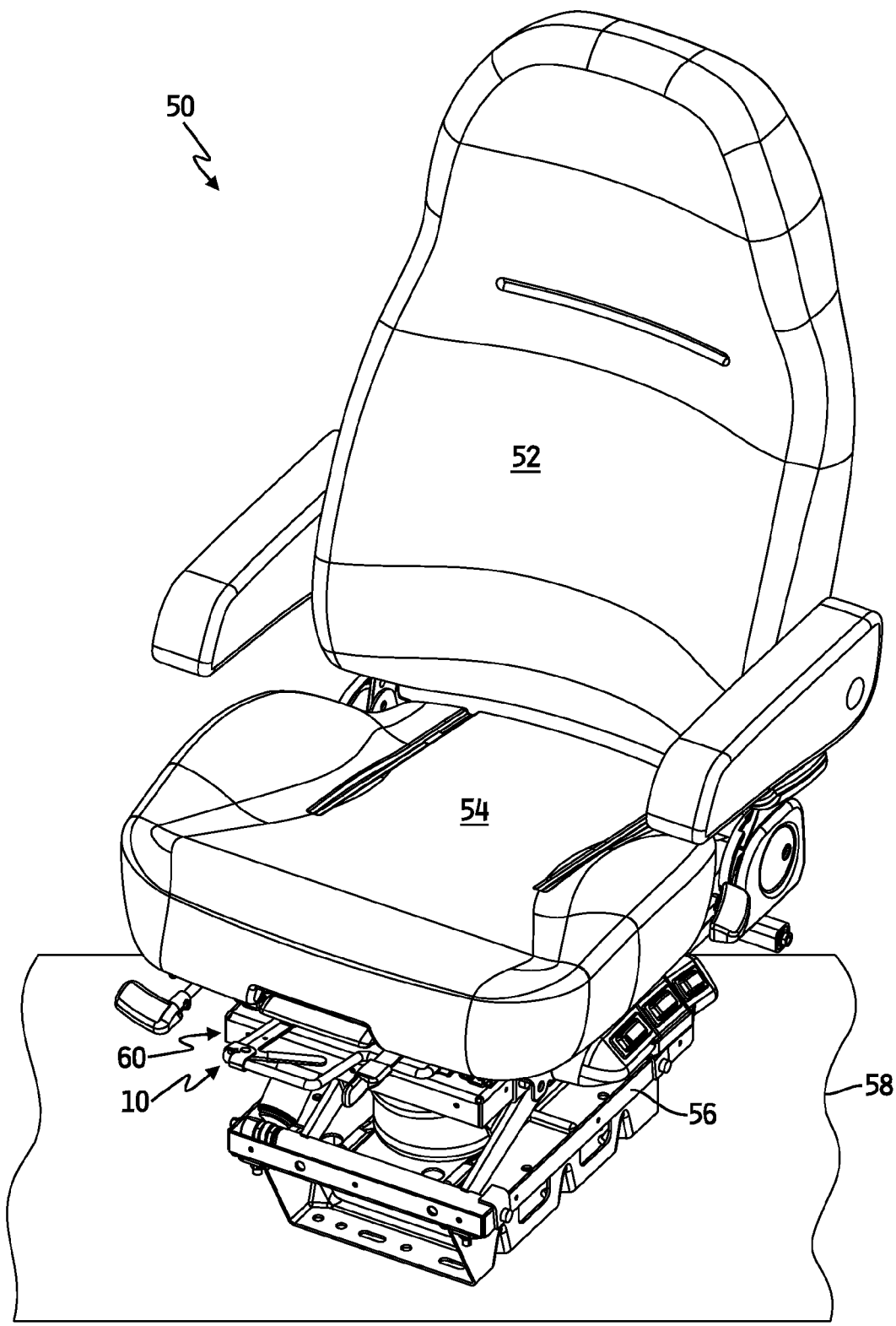
FIG. 1 is a diagram of an example vehicle seat that incorporates one illustrative embodiment of an apparatus for preventing actuation of a vehicle seat position adjustment device.

Referring now to FIG. 1, a diagram of an example vehicle seat 50 is shown that incorporates one illustrative embodiment of an apparatus 10 for preventing actuation of a vehicle seat position adjustment assembly 60. The vehicle seat 50 is conventional, and includes a seat back 52 and a seat bottom 54 mounted to a seat frame 56 that is mounted to a support surface 58, e.g., a floor, of a vehicle. The seat bottom 54 includes a frame member 14 that is attached to an underside of the seat bottom 54. The frame member 14 is not shown in FIG. 1, but is shown in FIGS. 2 and 4-9. For purposes of this disclosure, the vehicle seat 50 may be mounted in any occupant transporting vehicle. Examples of occupant transporting vehicles include, but are not limited to, conventional motor vehicles, including cars, trucks, buses, industrial machinery, utility vehicles and the like, conventional aircraft or watercraft, single or multiple-track rail vehicles including trains, trams, trolleys, monorail transport systems and the like. In the illustrated embodiment, the vehicle seat 50 is a conventional suspension seat, although the vehicle seat 50 may alternatively be implemented in other conventional forms.

Figure 2:
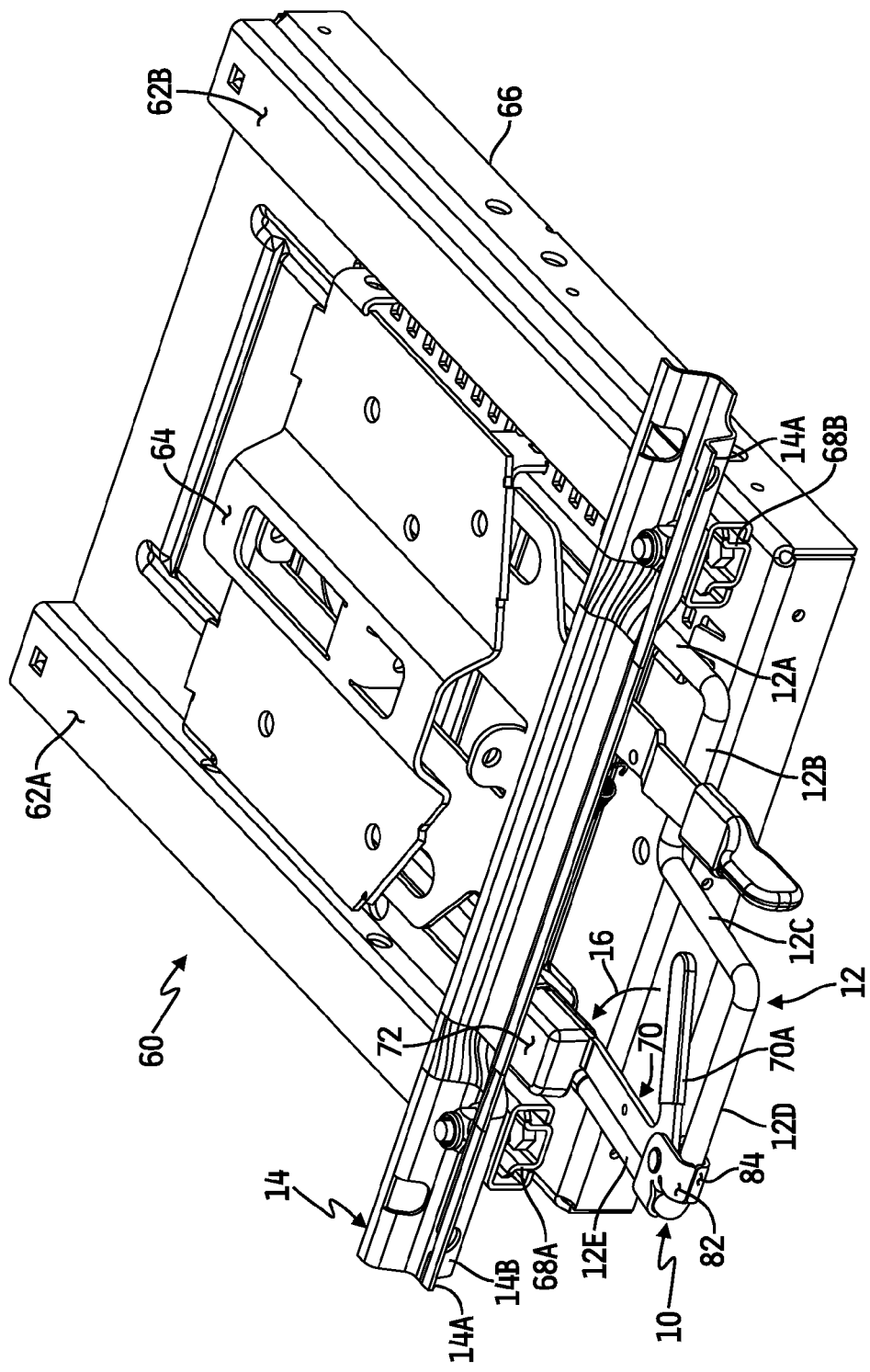
FIG. 2 is a perspective view of the vehicle seat position adjustment device that incorporates the embodiment of the actuation prevention apparatus illustrated in FIG. 1, and that is shown in a position, relative to a frame member of the vehicle seat, that prevents actuation of the vehicle seat position adjustment device.

Referring now to FIG. 2, a perspective view of the vehicle seat position adjustment assembly 60 that incorporates the embodiment of the actuation prevention apparatus 10 of in FIG. 1 is shown. In the illustrated embodiment, the vehicle seat position adjustment assembly 60 is conventional and includes a pair of sliding rails 62A and 62B and a bracket assembly 64 positioned therebetween, that are all configured to be mounted to the vehicle seat bottom 54. A carriage 66 is configured to be mounted to the vehicle seat frame 56, and includes brackets 68A and 68B that are slidably received within corresponding ones of the sliding rails 62A and 62B. The frame member 14 that is attached to the underside of the vehicle seat bottom 54 is affixed to the sliding rails 62A and 62B, and defines a flange 14A that extends outwardly away from a front face 14B of the frame member 14. The seat bottom 54 is omitted from FIG. 2, and from FIGS. 4-9, for clarity.

The vehicle seat position adjustment assembly 60 further includes a vehicle seat position adjustment device 12 in the form of a continuous tube that is bent or otherwise formed into a number of different sections, or a number of elongated tube sections that are connected together to form the vehicle seat position adjustment device 12. While the vehicle seat position adjustment device 12 illustrated in the figures of this document are illustrated as being circular in cross-section, it will be understood that the vehicle seat position adjustment device 12 may alternatively be provided having other cross sectional shapes. In any case, the vehicle seat position adjustment device 12 may illustratively include sections 12A and 12E that are each affixed at or near one end to the bracket assembly 64, and at an opposite end to ends of sections 12D and 12B respectively. Yet another section 12C extends between opposite ends of the sections 12B and 12D. In conventional embodiments, the section 12C may be manipulated by an occupant of the vehicle seat in the upward direction 18 to actuate the vehicle seat position adjustment assembly 60 so that the combination of the vehicle seat bottom 54 and seat back 52 may be adjustably positioned relative to the vehicle seat frame 56. Because the vehicle seat position adjustment device 12 is affixed to the bracket assembly 64, the vehicle seat position adjustment device 12 moves with the seat bottom 54 relative to the vehicle seat frame 56.

Operation of the vehicle seat position adjustment assembly 60 is conventional, and in the illustrated embodiment the vehicle seat position adjustment assembly 60 has a default or normal position in which it secures or locks the vehicle seat bottom 54 to the vehicle seat frame 56. The vehicle seat position adjustment assembly 60 is actuatable by, for example, lifting upwardly on the vehicle seat position adjustment device 12 in the direction of the arrow 18 (see FIG. 5). In the actuated position, the position of the vehicle seat bottom 54 (and seat back 52) relative to the vehicle seat frame 56 (and relative to the vehicle) may be adjusted forwardly or rearwardly, i.e., fore or aft. When the vehicle seat bottom 54 is located in a desired position relative to the vehicle seat frame 56 (and relative to the support surface 58), the vehicle seat position adjustment device 12 may be released so that it returns to its default or normal position and locks or secures the vehicle seat bottom 54 (and seat back 52) in the selected position relative to the vehicle seat frame 56 (and relative to the support surface 58).

Figure 3:
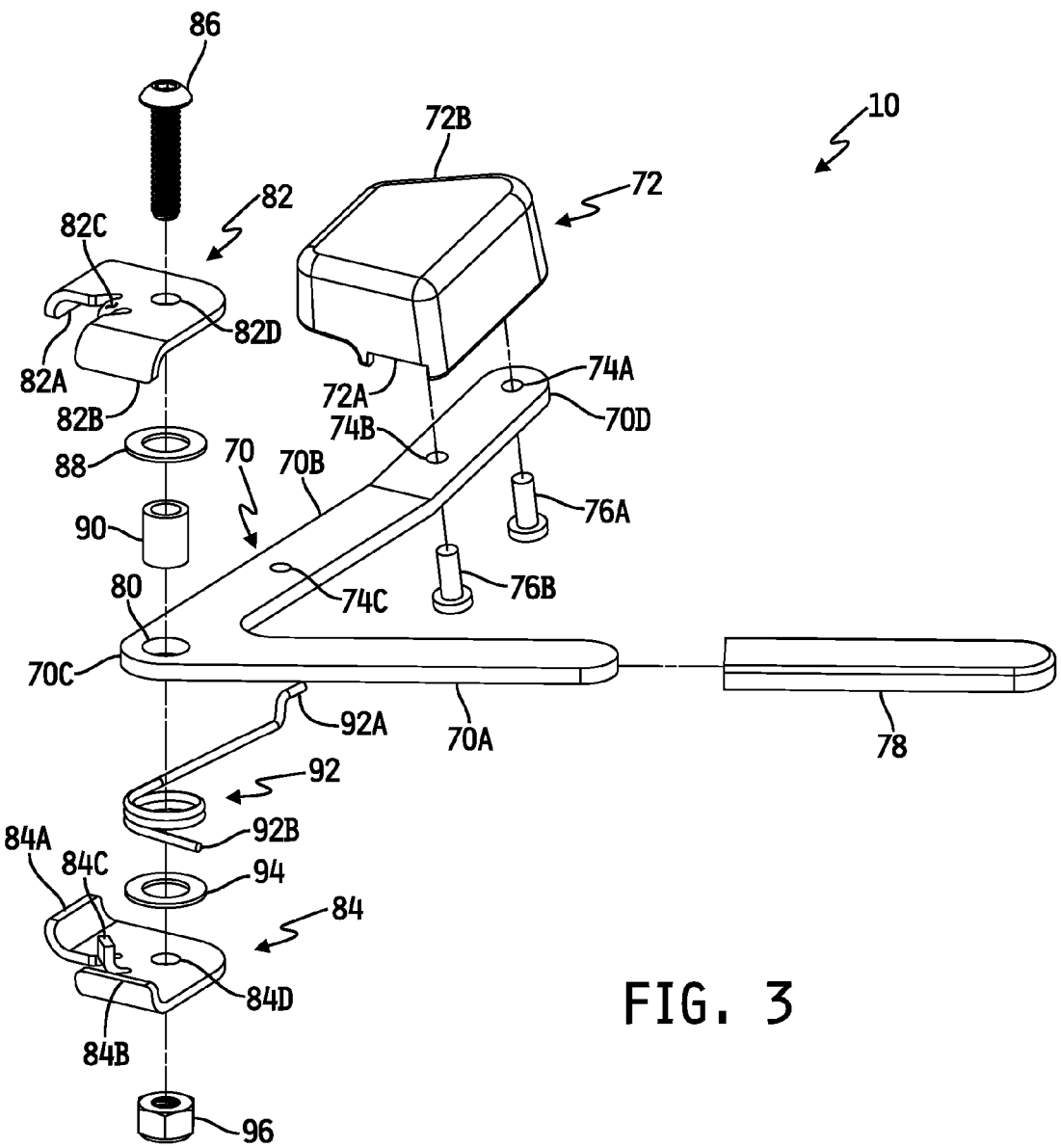
FIG. 3 is an exploded view of the actuation prevention apparatus of FIGS. 1 and 2.

In the embodiment illustrated in FIG. 2, the vehicle seat position adjustment assembly 60 further includes an apparatus 10 for normally preventing actuation of the vehicle seat position adjustment device 12 so that the seat bottom 54 is therefore not normally adjustable in the fore and aft directions relative to the seat frame 56. Referring to FIG. 3, an exploded view of the actuation preventing apparatus 10 of FIG. 2 is shown. In the illustrated embodiment, the apparatus 10 includes a handle 70 having a lever 70A and an elongated bracket member 70B. One end of the lever 70A and one end of the elongated bracket member 70B form a handle mounting portion 70C that defines a bore 80 therethrough. An opposite end of the lever 70A is free, and a cover 78 is illustratively provided that is sized to slide onto the lever 70A. In the illustrated embodiment, a portion 70D of the elongated bracket member 70B adjacent to its opposite end is raised at an angle relative to the handle mounting portion, although this disclosure contemplates other embodiments in which the portion 70D is not raised at an angle relative to the handle mounting portion 70C. Two bores 74A and 74B are defined through the portion 70D adjacent to the opposite end of the elongated bracket member 70B. In the illustrated embodiment, the lever 70A and the elongated bracket member 70B define an acute angle therebetween so that the handle 70 generally defines a V-shape. It will be understood, however, that this disclosure contemplates other embodiments of the handle 70 that are not V-shaped and/or in which the lever 70A and elongated bracket member 70B do not define an acute angle therebetween. Illustratively, the handle 70 is formed of steel, although this disclosure contemplates forming the handle 70 from other rigid or semi-rigid materials.

The actuation preventing apparatus 10 illustrated in FIG. 3 further includes a stop member 72 defining a channel 72A along its underside that is sized to receive therein the portion 70D of the elongated bracket member 70B. A pair of fixation members 76A and 76B, e.g., threaded or otherwise, are provided, and each extend through a corresponding one of the bores 74A and 74B and into engagement with the stop member 72 to thereby secure the stop member 72 to the elongate bracket member 70B adjacent its free end. Illustratively, the front surface 72B of the stop member 72 is not formed perpendicularly to the longitudinal axis of the elongated bracket member 70B, but rather is formed at an angle relative to the longitudinal axis of the elongated bracket member 70B. The angled front surface 72B of the stop member 72 will be described further hereinafter with reference to FIGS. 4 and 5. Illustratively, the stop member 72 is formed from a rubberized or plasticized composite that may be rigid or semi-rigid, although this disclosure contemplates that the stop member 72 may alternatively be formed from other rigid or semi-rigid materials. It will be understood that while the stop member 72 is illustrated in FIG. 3 as being separate from, and mountable to, the elongated bracket member 70B, this disclosure contemplates other embodiments in which the stop member and the elongated bracket member 70B are of unitary construction such that the stop member 72 defines a portion of the elongated bracket member 70B.

The actuation preventing apparatus 10 illustrated in FIG. 3 further includes a bracket assembly formed by two brackets 82 and 84. In the illustrated embodiment, the bracket 82 is generally V-shaped and includes a pair of curved flanges 82A and 82B formed at respective ends of the V. Between flanges 82A and 82B, the bracket 82 defines a third flange 82C. Forward of the third flange 82C is substantially flat body portion defining a bore 82D therethrough. The bracket 84 is configured identically to the bracket 82, and accordingly defines flanges 84A, 84B and 84C, and a bore 84D therethrough. The brackets 82 and 84 illustrated in FIG. 3 are configured such that the bracket 82 engages a top surfaces of the sections 12D and 12E of the vehicle seat position adjustment device 12 on either side of the junction between the sections 12D and 12E, and the bracket 84 engages the opposite, bottom surfaces of the sections 12D and 12E of the vehicle seat position adjustment device 12 with the brackets 82 and 84 juxtaposed with each other as illustrated in FIG. 2. In this position, the flanges 82A and 82B contact the flanges 84A and 84B respectively outwardly of the sections 12D and 12E of the vehicle seat position adjustment device 12, and the flange 82C contacts the flange 84C inwardly of the sections 12D and 12E. When the brackets 82 and 84 are secured to each other in this position, they act to securely clamp the sections 12D and 12E of the vehicle seat position adjustment device 12 therebetween.

The actuation prevention apparatus 10 illustrated in FIG. 3 further includes a biasing member 92 in the form of a coil spring having a substantially circular coil with two opposite ends 92A and 92B. The end 92A of the spring 92 is configured to be received within a bore 74C defined through the elongated bracket member 70B, and the end 92B is configured to engage the flanges 82B, 84B of the brackets 82 and 84 respectively when the brackets 82 and 84 are secured to the vehicle seat position adjustment device 12. The spring 92 is thus positioned or coupled between the bracket 82, 84 and the elongated bracket member 70B, and is configured to apply a biasing force between the vehicle seat position adjustment device 12 and the handle 70, or more specifically between the vehicle seat position adjustment device 12 and the stop member 72. It will be understood that while only one spring 92 is illustrated in FIG. 3, the actuation prevention apparatus 10 may alternatively include any number of such springs or other biasing members.

The actuation prevention apparatus 10 illustrated in FIG. 3 further illustratively includes a pair of washers 88, 94, a conventional spacer 90 and fixation members 86 and 96. The fixation members 86 and 96 are illustrated in FIG. 3 as being a threaded screw or bolt and a threaded nut respectively, although this disclosure contemplates other embodiments wherein the fixation members 86 and 96 include only a single component and/or wherein the fixation member or members is/are not threaded. Referring to the illustrated embodiment, the actuation prevention apparatus 10 is assembly by passing the fixation member 86 through, in order, the bore 82D of the bracket 82, the washer 88, the spacer 90, the bore 80 of the handle 70, the coil of the spring 92, the washer 94, the bore 84 of the bracket 84, and into engagement with the fixation member 96. The fixation members 86 and 96 are, in the illustrated embodiment, complementarily threaded, and the actuation prevention apparatus 10 is thus secured to the sections 12D and 12E of the vehicle seat position adjustment device 12.

Figure 5:
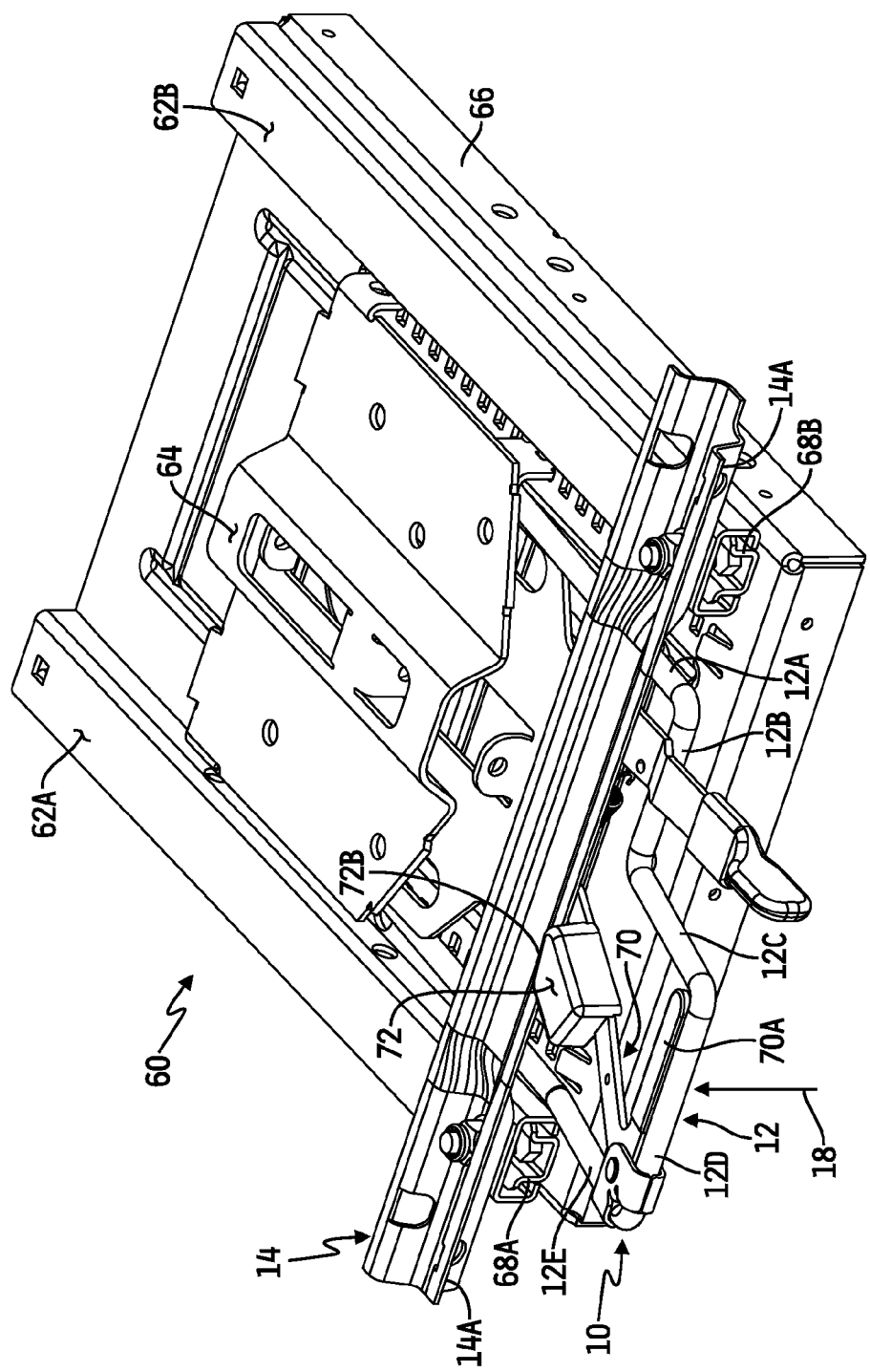
FIG. 5 is a perspective view similar to FIGS. 2 and 4 showing the actuation prevention apparatus in a position, relative to the frame member of the vehicle seat, that allows actuation of the vehicle seat position adjustment device, and also showing the vehicle seat position adjustment device in an actuated position so that the fore and aft position of the vehicle seat may be adjusted.

Referring again to FIG. 2, the spring 92 (not shown in FIG. 2) of the actuation prevention apparatus 10 acts between the vehicle seat position adjustment device 12 and the stop member 72, or more specifically between the brackets 82, 84 and the handle 70, in the direction 16 to normally bias at least a portion of the handle, i.e., the stop member 72, into engagement with the vehicle seat bottom 54 generally, and more specifically into engagement with the frame member 14 of the vehicle seat bottom 54, to thereby prevent actuation of the vehicle seat position adjustment device 12, i.e., in the upward direction 18 as illustrated in FIG. 5. In this position, the lever 70A of the handle 70 is offset from the section 12D of the vehicle seat position adjustment device 12 as illustrated in FIG. 2.

Figure 4:
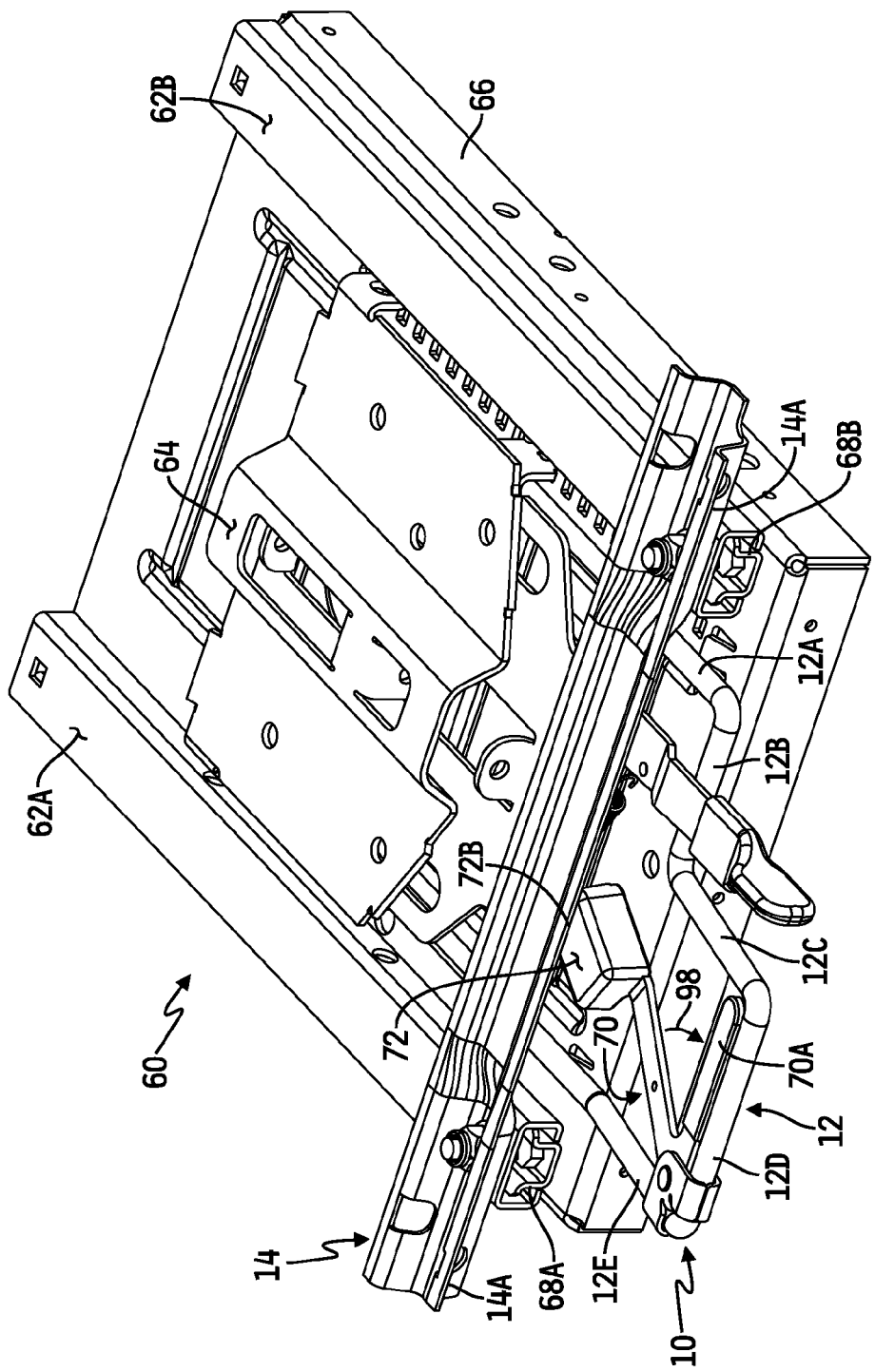
FIG. 4 is a perspective view similar to FIG. 2 showing the actuation prevention apparatus in a position, relative to the frame member of the vehicle seat that allows actuation of the vehicle seat position adjustment device.

Referring now to FIG. 4, the actuation prevention apparatus 10 is shown in a position, relative to the frame member 14 of the vehicle seat 54 that allows actuation of the vehicle seat position adjustment device 12. In the illustrated embodiment, a force has been applied to the lever 70A in the direction 98 that is greater than the biasing force applied to the handle 70 by the biasing spring 92, and the handle 70 has thus moved from its normally biased position shown in FIG. 2 to a position in which the lever 70A is adjacent to the section 12D of the vehicle seat position adjustment device 12. In the illustrated position, the stop member 72 is drawn sufficiently away from the vehicle seat bottom 54 generally, and more specifically from the frame member 14 of the vehicle seat bottom 54, to allow actuation of the vehicle seat position adjustment device 12, i.e., in the upward direction 18 as shown in FIG. 5. Illustratively, the front face 72B of the stop member 72 is angled such that it is substantially parallel with the longitudinal axis of the frame member 14 of the vehicle seat bottom 54 when the apparatus 10 is in the position that allows actuation of the vehicle seat position adjustment device as illustrated in FIG. 4.

Referring now to FIG. 5, the actuation prevention apparatus 10 is shown in a position, relative to the frame member 14 of the vehicle seat bottom 54, that allows actuation of the vehicle seat position adjustment device 12, and also showing the vehicle seat position adjustment device 12 in an actuated position so that the fore and aft position of the vehicle seat bottom 54 may be adjusted. In the illustrated embodiment, the apparatus 10 is in the position shown in FIG. 4 so that it allows actuation of the vehicle seat position adjustment device 12, and the vehicle seat position adjustment device 12 has been actuated in the upward direction indicated by the directional arrow 18. As the vehicle seat position adjustment device 12 is lifted upwardly in the direction 18, the stop member 72 is no longer in contact with the frame member 14 of the vehicle seat bottom 54 and therefore moves upwardly with the vehicle seat position adjustment device 12 adjacent to the flange 14A of the frame member 14. When the vehicle seat position adjustment device 12 reaches a predetermined position in the direction 18, the vehicle seat position adjustment assembly 60 is actuated in a conventional fashion to allow the fore/aft position of the combination vehicle seat bottom 54 and seat back 52 to be selectively adjusted. When a desired position is selected, the upward force on the vehicle seat position adjustment device 12 in the direction 18 is removed and the force on the lever 70A in the direction 98 is likewise removed. The vehicle position adjustment device 60 is operable to automatically return, under bias, in a conventional manner to its position illustrated in FIGS. 2 and 4, and the actuation prevention apparatus 10 is operable to return, under the bias of the spring 92, to its position illustrated in FIG. 2.

Figure 6:
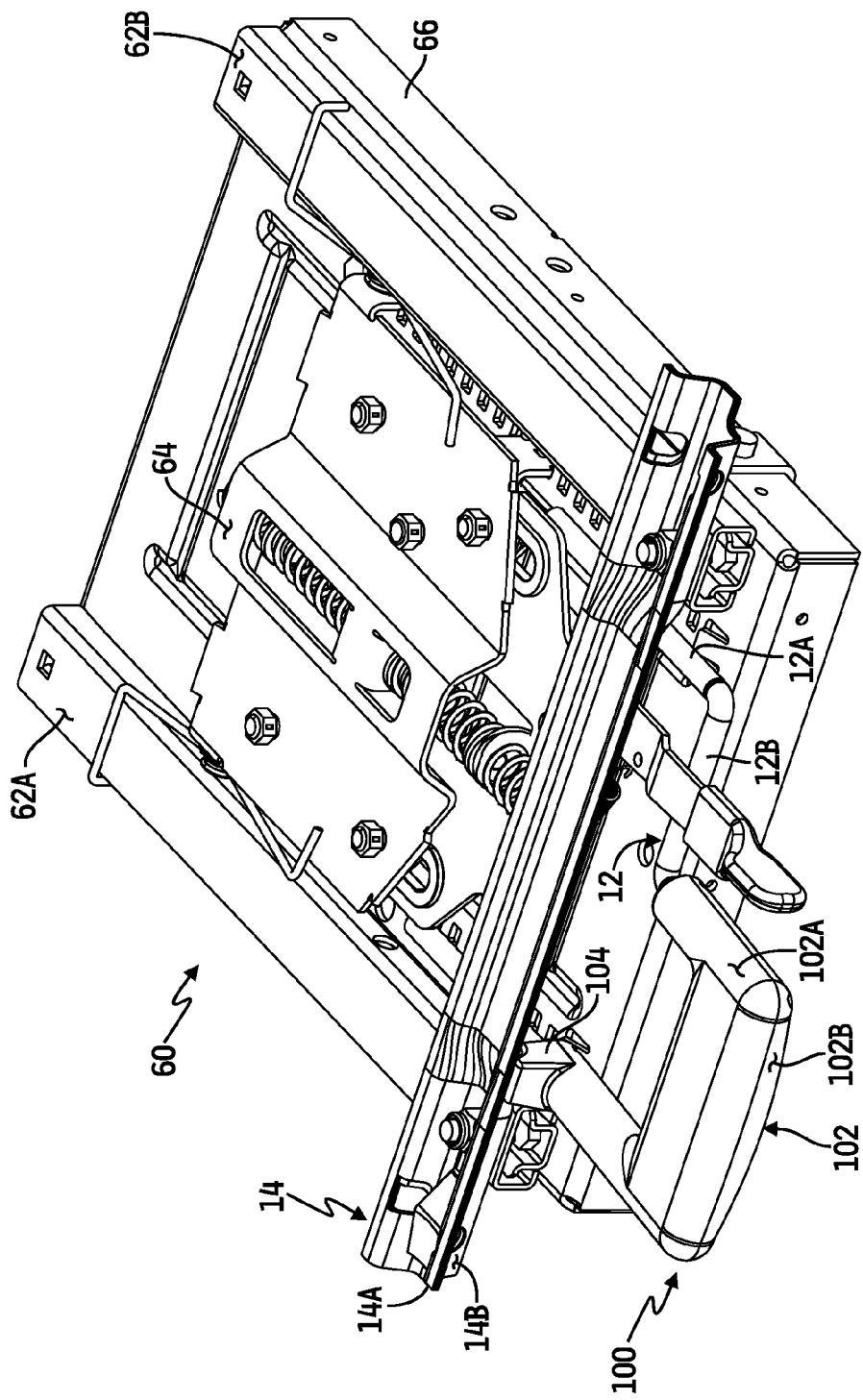
FIG. 6 is a perspective view of the vehicle seat position adjustment device that incorporates another illustrative embodiment of an actuation prevention apparatus shown in a position, relative to the frame member of the vehicle seat that prevents actuation of the vehicle seat position adjustment device.
Figure 8:
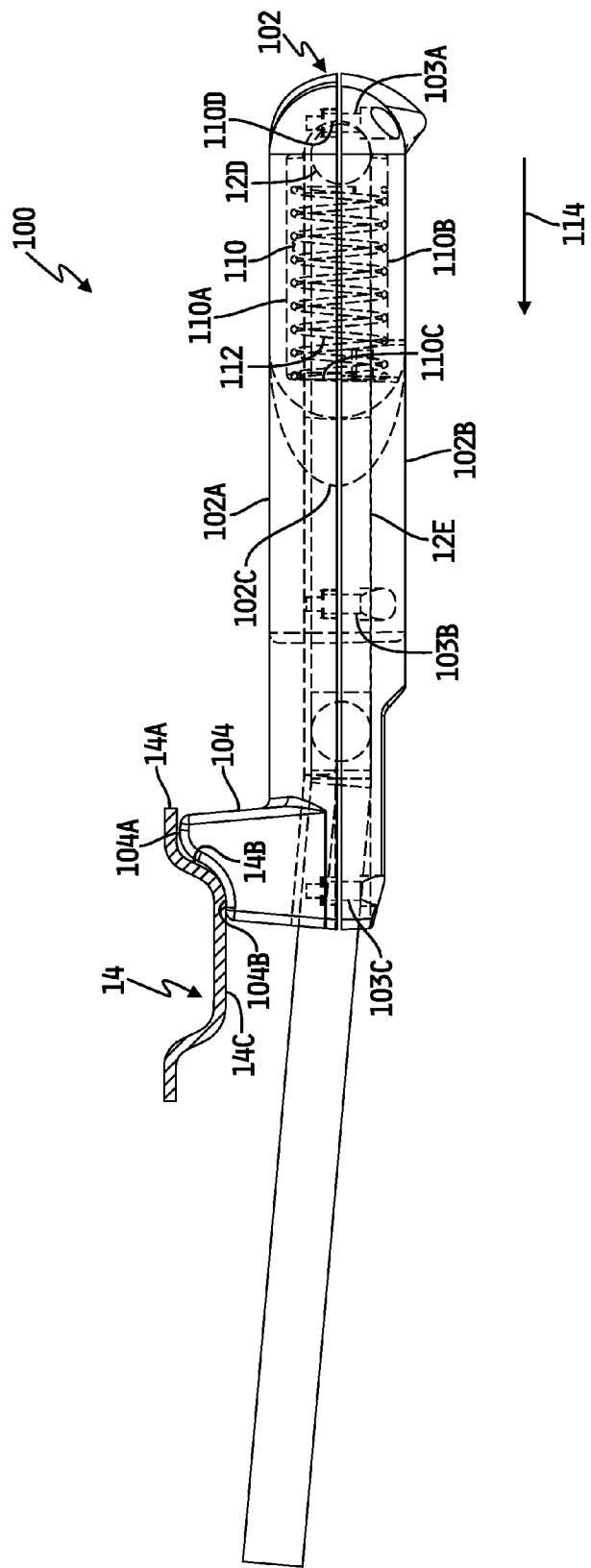
FIG. 8 is a side and partial cutaway view of the apparatus of FIGS. 6-7 illustrating the apparatus in a position, relative to the frame member of the vehicle seat that prevents actuation of the vehicle seat position adjustment device.
Figure 9:
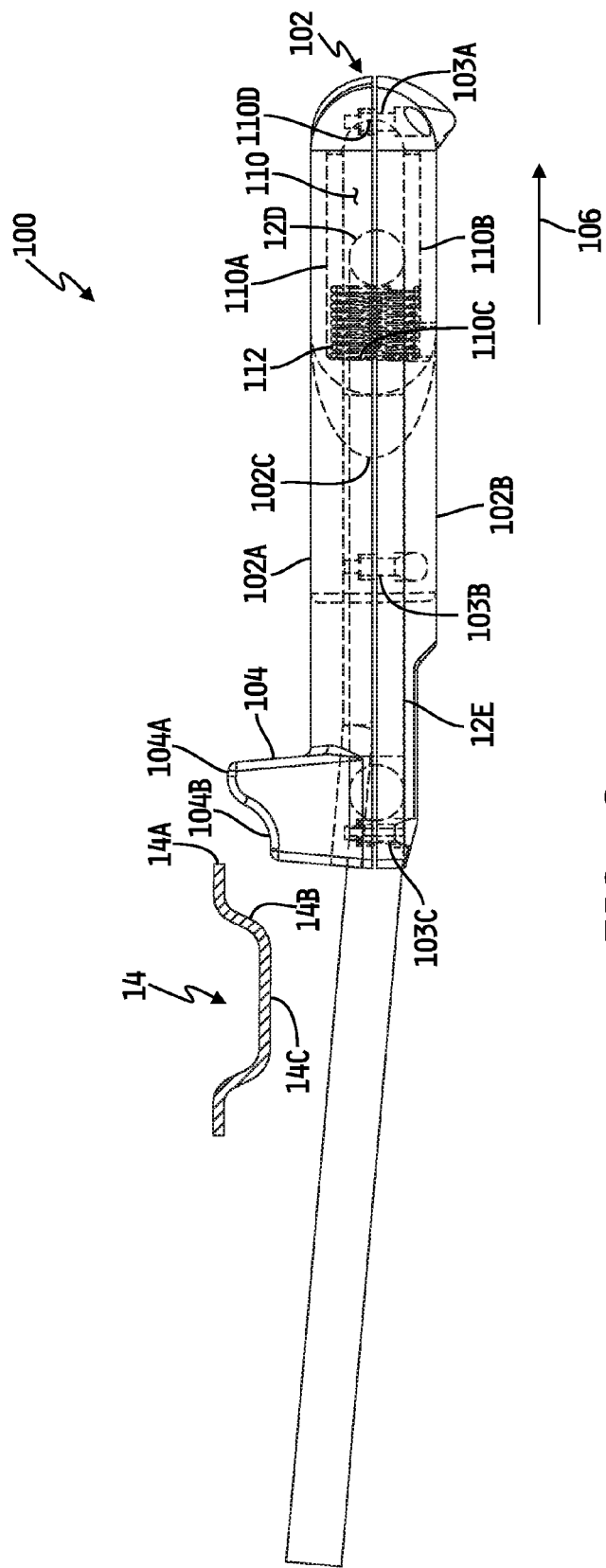
FIG. 9 is a side and partial cutaway view of the apparatus of FIGS. 6-8 illustrating the apparatus in a position, relative to the frame member of the vehicle seat that allows actuation of the vehicle seat position adjustment device.

Referring now to FIG. 6, a perspective view is shown of the vehicle seat position adjustment assembly 60 that incorporates another illustrative embodiment of an apparatus 100 for preventing actuation of the vehicle seat position adjustment assembly 60 generally and of the vehicle seat position adjustment device 12 specifically. In the illustrated embodiment, the vehicle seat position adjustment assembly 60 is identical to that illustrated and described with respect to FIGS. 2-5, and thus includes the vehicle seat position adjustment device 12 and the frame member 14 described above. The apparatus 100 for preventing actuation of the seat position adjustment device 12 includes a housing 102 that is configured to engage the seat position adjustment device 12 and to extend at least partially about the seat position adjustment device 12. In the illustrated embodiment, for example, the housing 102 includes top and bottom housing members 102A and 102B respectively that are configured to receive therein at least portions of the sections 12C, 12D and 12E of the seat position adjustment device 12. Illustratively, the top 102A and bottom 102B of the housing 102 are configured to be attached to each other about the seat position adjustment device 12 with at least a portion of the seat position adjustment device 12, e.g., at least portions of sections 12C, 12D and 12E, trapped between the top 102A and bottom 102B of the housing 102. The housing 102 is thus movable relative to the seat position adjustment device 12. FIGS. 8 and 9 show attachment members 103A and 103B that may be used to extend through and/or into portions of the top 102A and bottom 102B of the housing 102 to attach the top 102A and bottom 102B together.

In one alternative embodiment, the housing 102 may be configured to extend only partially about one or more of the sections of the seat position adjustment device 12. In another alternative embodiment, the housing 102 may be configured to contact, but not extend about or around the seat position adjustment device 12. In still another alternate embodiment, the housing 102 may be provided in the form of two or more sub-components, one or more of which may be attached to the seat position adjustment device 12 and one or more of which may be movable relative to another one or more sub-components. In any case, the housing 102 is configured to engage the seat position adjustment device 12.

A portion of the housing 102 is configured to engage the frame member 14 of the vehicle seat bottom 54 in order to prevent actuation of the seat position adjustment device 12. In the illustrated embodiment, for example, the housing 102 includes a stop member 104 that is configured to engage the frame member 14 of the vehicle seat bottom 54. In the illustrated embodiment, the stop member 104 is separate from the housing 102. In this embodiment, the stop member 104 is attachable to the housing 102 via one or more conventional attachment structures and/or media. In the embodiment illustrated in FIGS. 8 and 9, for example, an attachment member 103C extends through the top 102A and bottom 102B of the housing 102 and into engagement with the stop member 104 to mount and secure the stop member 104 to the housing 102. Alternatively, the stop member 104 may be formed integral with the housing 102 so that the housing 102 and the stop member 104 are of unitary construction, and the stop member 104 is thus defined by a portion of the housing 102. In any case, the housing 102 and the stop member 104 may be formed of any suitable one or combination of materials. In one illustrative embodiment, for example, the housing 102 and the stop member 104 are both formed of a conventional, formable plastic material, although this disclosure contemplates that the housing 102 and/or stop member 104 may alternatively be formed of, or include, one or more other suitable materials.

The apparatus 100 further includes at least one biasing member that is positioned between the housing 102 and the seat position adjustment device 12. The at least one biasing member is configured to normally bias the portion of the housing 102 that is configured to engage the frame member 14, e.g., the stop member 104, into engagement with the frame member 14 of the seat bottom 54 to prevent actuation of the seat position adjustment device 12. In the illustrated embodiment, for example, the at least one biasing member is provided in the form of two coil springs 112, one of which is shown in FIGS. 8 and 9. In this embodiment, and referring now to FIGS. 8-9, the top portion 102A of the housing 102 defines two side-by-side and spaced-apart, semi-cylindrical channels 110A, one of which is illustrated in FIGS. 8 and 9, and the bottom portion 102B of the housing 102 likewise defines two side-by-side and spaced-apart, semi-cylindrical channels 110B, one of which is illustrated in FIGS. 8 and 9. When the top portion 102A and bottom portion 102B are brought together to form the housing 102, each pair 110A, 110B of the semi-cylindrical channels are juxtaposed to define a corresponding pair of cylindrical channels 110 (only the channel 110 is shown in FIGS. 8 and 9). The section 12D of the seat position adjustment device 12 extends transversely through each of the channels 110, and a coil spring 112 is positioned within each of the channels 110 between the section 12D of the seat position adjustment device 12 and one end 110C of each of the channels 110. It will be understood that while the embodiment illustrated in FIGS. 6-9 are illustrated and/or described has including two biasing springs 112, this disclosure contemplates alternative embodiments that have more or fewer biasing members generally. It will further be appreciated that the at least one biasing member 112 may alternatively be provided in other conventional forms including, for example, but not limited to, one or more flat springs, one or more leaf springs, or one or more other conventional mechanisms configured to establish a biasing force between the seat position adjustment device 12 and the housing 102. It will further be appreciated that the housing 102 and/or stop member 104 may be alternatively configured such that the one or more biasing members 112 may be configured to apply a rotational biasing force between the housing 102 and the seat position adjustment device 12, rather than a linear biasing force as illustrated in the attached figures, to force the stop member 104 into engagement with the frame member 14 of the vehicle seat bottom 54.

Figure 7:
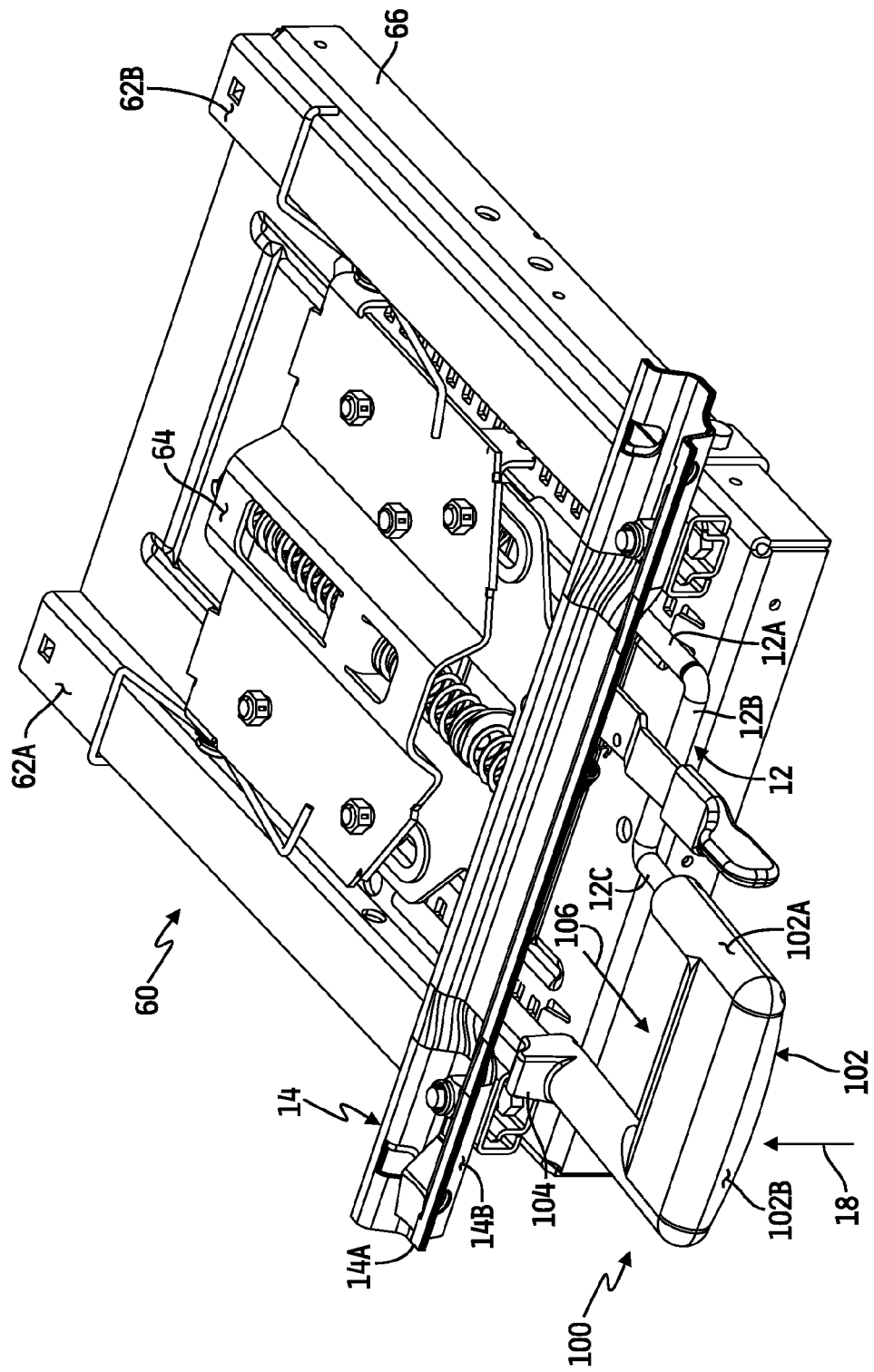
FIG. 7 is a perspective view of the embodiment illustrated in FIG. 6 showing the actuation prevention apparatus in a position, relative to the frame member of the vehicle seat that allows actuation of the vehicle seat position adjustment device.

In operation, the springs 112 apply a linear biasing force between the housing 102 and the section 12D of the seat position adjustment device 12 that is sufficient to normally force the stop member 104, in a direction indicated by the arrow 114, into engagement with the frame member 14 of the vehicle seat bottom 54 to thereby prevent actuation of the seat position adjustment device 12, as illustrated in FIGS. 6 and 8. When it is desired to actuate the seat position adjustment device 12 (as shown by example in FIG. 5) to thereby adjust a position of the vehicle seat bottom 54 (and seat back 52) relative to the vehicle seat frame 56 (and relative to the support surface 58) as described hereinabove, a force sufficient to overcome the biasing force of the one or more biasing members, e.g., springs 112, may be applied to the housing 102, e.g., to the surface 102C shown in FIGS. 8 and 9 in a direction indicated by the arrow 106 (FIG. 9). This forces the section 12D of the seat position adjustment device 12 into engagement with the wall 110D of the channel 110, and further forces the one or more biasing members 112 toward the section 12D of the seat position adjustment device 12 (e.g., compresses the spring(s) 112). This action moves the entire housing 102, including the stop member 104, in the direction 106 toward the section 12D of the seat position adjustment device 12, as illustrated in FIG. 9. Because the housing 102 is movable relative to the remaining sections 12A-12B and 12E of the seat position adjustment device 12, application of a sufficient force in the direction of the arrow 106 thus draws the stop member 104 away from the frame member 14, as illustrated in FIGS. 7 and 9, and thereby disengages the stop member 104 from the frame member 14 to allow actuation of the seat position adjustment device 12 as described above.

The stop member 104 is generally configured to normally engage the frame member 14, and to prevent actuation of the seat position adjustment device 12 when engaging the frame member 14. Referring again to FIGS. 8 and 9, for example, the edge of the frame member 14 that faces the stop member 104 defines a contoured surface comprising the flange 14A that transitions to a generally vertical section or front face 14B. The generally vertical section 14B terminates at a generally horizontal underside surface 14C of the frame member 14. In this embodiment, the surface of the stop member 104 that engages the frame member 14 defines a generally higher elevation horizontal section 104A that transitions to a generally lower elevation horizontal section 104B. When the stop member 104 engages the frame member 14, under the biasing force of the one or more biasing members 112 as described hereinabove, the higher elevation horizontal section 104A of the stop member 104 contacts the underside of the flange 14A of the frame member 14, and the lower elevation horizontal section 104B of the stop member 104 contacts the generally horizontal underside surface 14C of the frame member 14, as illustrated in FIG. 8. In the illustrated embodiment, the engagement of the stop member 104 with the frame member 14, as illustrated in FIG. 8, generally inhibits upward movement of the seat position adjustment device 12 (i.e., in the direction indicated by the arrow 18 of FIG. 9). The stop member 104 is generally configured relative to the frame member 14 to sufficiently inhibit or restrict upward movement of the seat position adjustment device 12 so that the seat position adjustment device 12 will not be actuated as described hereinabove. Actuation of the seat position adjustment device 12 is thus prevented when the stop member 104 engages the frame member 14. The apparatus 100 is designed such that when force is applied to the housing 102 (e.g., in the direction of the arrow 106) to allow for actuation of the seat position adjustment device 12 as described hereinabove, the stop member 104 is sufficiently movable away from the frame member 14 to allow the stop member 104 to clear the frame member 14 upon subsequent application of an upward force (e.g., in the direction indicated by the arrow 18) to the housing 102 and/or seat position adjustment device 12 so that the seat position adjustment device 12 may be actuated.

It will be understood that the vehicle seat frame engaging surface(s) of the stop member 104 of the embodiment illustrated in FIGS. 6-9 and/or the stop member 72 of the embodiment illustrated in FIGS. 1-5, may be alternatively configured, and the present disclosure contemplates any number of contours, profiles, slots, channels, or the like that may be formed by, in or on the stop member 104 and/or 72 to appropriately engage the frame member 14 in order to prevent actuation of the seat position adjustment device 12. It will be appreciated that other embodiments of the seat position adjustment device 12 may require a downward, sideways, twisting or other force applied thereto in order to actuate the seat position adjustment device 12, and in such other embodiments, the stop member 104 and/or 72 will be appropriately configured to prevent actuation of the seat position adjustment device 12 when the stop member 104 and/or 72 engages the frame member 14 and to allow actuation of the seat position adjustment device 12 when the stop member 104 and/or 72 disengages the frame member 14.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while in the illustrated embodiments, the vehicle seat adjustment assembly 60 has been described as being configured to provide for adjustment of the fore/aft position of the vehicle seat 50 relative to the vehicle seat frame 56, it will be understood that the vehicle seat position adjustment assembly 60 may be configured to alternatively provide for adjustment of the vehicle seat 50 in one or more other directions relative to the vehicle seat frame 56 and support surface 58. In other words, the actuation prevention mechanism, e.g., 10 or 100, may be implemented with other vehicle seat position adjustment devices to selectively prevent adjustable movement of the vehicle seat 50 in one or more other directions relative to the vehicle seat frame 56 and support surface 58. As another example, while the apparatus 10 and 100 for preventing actuation of the seat position adjustment device 60 have been illustrated and described herein as being mounted to the vehicle seat position adjustment device 12 and being actuated such that it engages or is drawn away from the frame member 14 of the vehicle seat bottom 54, the apparatus 10 or 100 may alternatively be mounted to the frame member 14 and may be configured to be actuated such that it engages or is drawn away from the vehicle seat adjustment device 12.

What is claimed is:

1. Apparatus for preventing actuation of a seat position adjustment device coupled to a vehicle seat that is adjustably mounted to a vehicle seat frame, the apparatus comprising:
   a stop member,
   a handle comprising a lever having a free end and an opposite end, and an elongated bracket member having a free end and an opposite end, the free end of the elongated bracket member having the stop member mounted thereto, the opposite ends of the lever and the elongated bracket member together forming a handle mounting portion, and
   a bracket configured to affix the handle to the seat positioning device, and
   at least one biasing member comprising a spring extending between the bracket and the handle, the at least one biasing member configured to normally bias the stop member into engagement with the vehicle seat to prevent actuation of the seat position adjustment device,
   wherein the handle is responsive to force applied thereto that is greater than a biasing force applied to the stop member by the at least one biasing member to draw the stop member away from the vehicle seat to allow actuation of the seat position adjustment device.

2. The apparatus of claim 1 further comprising a fixation member configured to extend through the bracket, through the handle mounting portion of the handle and through the spring to movably mount the handle and spring to the bracket and to rigidly secure the bracket to the seat position adjustment device.

3. The apparatus of claim 2 wherein the bracket comprises a first bracket and a second bracket, the first and second brackets secured together by the fixation element to clamp the handle mounting portion of the handle between the first and second brackets.

4. The apparatus of claim 3 wherein the first and second brackets are configured to clamp the handle mounting portion of the handle to the seat position adjustment device.

5. The apparatus of claim 1 wherein a portion of the elongated bracket member adjacent to the free end thereof is raised at an angle relative to the handle mounting portion.

6. The apparatus of claim 1 wherein the lever and the elongated bracket member define an acute angle therebetween.

7. The apparatus of claim 1 wherein the stop member defines a channel therein sized to receive a portion of the elongated bracket member adjacent to the free end thereof.

8. The apparatus of claim 7 wherein the portion of the elongated bracket member adjacent to the free end thereof defines a plurality of bores therethrough,
   and wherein the apparatus further comprises a plurality of fixation members each extending through a different one of the plurality of bores to secure the stop member to the elongated bracket member.

9. The apparatus of claim 1 wherein the stop member and the elongated bracket member are of unitary construction.

10. The apparatus of claim 1 wherein the stop member defines a front surface formed at an angle relative to a longitudinal axis of the elongated bracket member.

11. The apparatus of claim 1 further comprising a cover sized to slide onto the lever.

* * * * *